Patented Jan. 9, 1923.

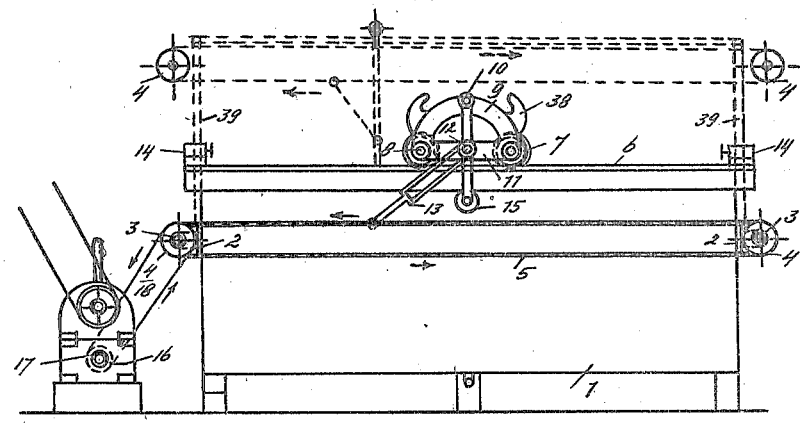

1,441,790

UNITED STATES PATENT OFFICE.

CORNELIS PIETER DROS, OF HEEMSTEDE, NETHERLANDS.

CHEESE-MAKING MACHINE.

Application filed July 15, 1922. Serial No. 575,294.

*To all whom it may concern:*

Be it known that I, CORNELIS PIETER DROS, a citizen of the Kingdom of the Netherlands, residing at Heemstede, Netherlands, have invented certain new and useful Improvements in or Relating to Cheese-Making Machines, of which the following is a specification.

There are known cheesemaking machines in which the gear operating the cutting and the stirring devices is mounted above the trough containing the cheese. The cutting and stirring devices are rotatably mounted in the trough and are operatively connected with several vertically suspended rotary shafts arranged in the longitudinal axis of the machine. The known machines are very little used as they are not practical and are very expensive. They do not produce a satisfactory article owing to the difference in the angular velocities of the cutters and the fact that it is impossible to work the whole of the cheese by the cutters. Further disadvantages are: The fact that owing to the suspension of the driving gear from the ceiling, the installation is very difficult and expensive, and the inspection and the lubrication of the rotating parts are somewhat difficult; the driving gear is entirely separate from the trough containing the cheese, and must therefore be dismounted if the cheese trough has to be moved; the milk is very liable to be polluted by oil and grease particles dropping down from the transmission gear; the operation and construction of the cutting and stirring devices are very defective; a large number of stirring and cutting devices is required which renders the means of connection with the driving gear very complicated; the trough and the apparatus for holding the cheese are very liable to be damaged and the curds are not worked through in a perfect manner.

It is the object of the present invention to provide a cheesemaking machine which is free from the disadvantages pointed out above.

In the improved machine forming the subject of the invention, the trough containing the cheese or the curds and the driving gear are combined to form a compact machine; the cutting and the stirring devices are connected with the driving gear by means of a shaft which extends transversely above the cheese containing trough and is adapted to be reciprocated in the longitudinal direction of the trough; the stirring device is combined with a cutting device and is adapted to turn within the trough.

The accompanying drawings show by way of example one construction of the improved cheesemaking machine;

Fig. 1 is an elevation of the complete machine;

Fig. 2 is partly an end view and partly a transverse section of the machine;

Fig. 3 is an elevation of the suspension device;

Fig. 4 is a front view of the suspension device; shown in Fig. 3;

Fig. 5 is an elevation of the cutting device;

Fig. 6 is a front view of the cutting device shown in Fig. 5;

Fig. 7 is an elevation of the stirring device;

Fig. 8 is a front view corresponding to Fig. 7;

Fig. 9 is an elevation of an alternative construction of the suspension device;

Fig. 10 is a front view corresponding to Fig. 9.

The driving gear (Figs. 1 and 2) comprises two bearings 2 fixed to each end face of the trough 1. In these bearings are rotatably mounted shafts 3 carrying chain wheels 4 and chains 5 arranged outside and close to the longitudinal sides of the trough. Upon the longitudinal edges of the trough are secured rails 6, upon which run carriages comprising each two wheels 7, two shafts 8, a quadrant 9 formed at the top with a recess 10, and connecting bars or plates 11. In these carriages is mounted a shaft 12 extending transversely above the cheese containing trough. The carriages are adapted to be driven by the two chains 5 by means of coupling rods 13 each of which is pivoted at one end to a member of the corresponding chain 5 and is provided at the other end with a loop embracing the corresponding projecting end of the shaft 12. The rods 13 are held in position by nuts or the like, and their slotted or looped formation enables shaft 12 to momentarily remain at rest on reaching either end of the trough.

The rails 6 are provided at each end with an adjustable spring stop 14 for limiting the movement of the carriages. In order to prevent tilting of the carriage under the pressure exerted by the cutting and stirring devices, each end of the shaft 12 is guided by means of a depending arm and a roller 15 along the underface of a flange or rim of the trough.

The driving gear of the machine may be driven either by a belt or belts or by means of an electric motor, for instance through an intermediate gear 16 which enables the speed of the shaft 12 to be adjusted within the required limits.

The movement of the intermediate gear 16 may be transmitted through a belt or chain drive 17, 18 to one of the shafts 3, that is to the shaft fixed at the milk discharge end of the trough so that when the trough is tilted for discharging the milk, the connection between the intermediate gear and the shaft 3 is maintained.

The suspension device (Figs. 3 and 4) comprises two arms 19 having notches 20 and hooks 21 and connected to one another by rods 22 and 23. The ends of the rods 23 project upwardly through the arms 19, 19.

The cutting device (Figs. 5 and 6) comprises a frame 24 provided with hooks 25, a number of parallel knives or cutters 26, and pivot pins 27 arranged at the sides of the trough.

The stirring device (Figs. 7 and 8) is somewhat similar to the cutting device, but possesses no hooks 25. At the upper and lower ends of the frame 28 of the stirring device are fixed stirring members 29, 29 which may be either flat or angular or otherwise shaped. Between the members 29, 29 is arranged a third transverse member or pressure plate 30, which stands approximately at right angles to the surface of the stirring frame and is arranged approximately in the middle of the frame. Both at the top and at the bottom of the frame is suspended a chain 31.

The cutting device is secured to the suspension device by placing the hooks 25 upon the rod 22 and simultaneously inserting the pivots 27 into the notches 20.

The stirring device is similarly supported by inserting the pivot pins 27 into the notches 20 of the suspension device, so that when the stirring device is turned, either one or the other of the two stirring members 29 strikes and rests against the transverse rod 22 which serves as a stop for limiting the turning movement of the stirring device.

The suspension device together with the cutting and stirring devices mounted therein is coupled to the shaft 12 by lifting the whole suspension device into the trough 1, inserting the ends of the rod 23 into the recesses 10 of the quadrants 9, and placing the hooks 21 upon the shaft 12.

The operation of the machine is as follows:

After the milk has turned to curds and the suspension device with the cutting device has been suspended from the shaft 12, the machine is started. The cutting device passes to and fro through the trough containing the curds and cuts the curds into long strips which fall apart in the form of flakes during the cutting operation. The whey is then partly discharged and the stirring device is applied and moved with considerable speed forwards and backwards through the trough whereby the material is further cut and simultaneously intensively stirred by the stirring members 29.

When the stirring device reaches the end of the trough and the movement of the carriage is reversed, the pressure upon the stirring device changes its direction and consequently the frame is forced away from the stop rod 22 and is turned. This turning of the frame is assisted by the action of the pressure plate 30 and continues until the other stirring member strikes the stop rod 22. The curds lying in the end portions of the trough are by the turning of the stirring frame carried to the surface and are removed from the dead corners of the trough and are intensively stirred; this action will particularly occur with suitably bent stirring members.

As the bottom of the cheese containing trough is not level, but is frequently considerably and irregularly deformed by the weight of the milk, the material lying upon the bottom of the trough is frequently not worked properly and may, in heating, stick to the bottom of the trough. In order to avoid this drawback, the previously mentioned chains 31 are provided which are dragged behind the stirring device over the bottom of the trough and serve to loosen the curds. The chains take part in the rotary movement of the stirring device, but lag behind the stirring frame so that there is no risk of any stoppage by the chains.

The automatic turning of the stirring device, and if desired, also that of the cutting device, may be effected by other means, for instance, by the aid of a suspension device of the kind illustrated in Figs. 9 and 10. This suspension device comprises two elbow arms 32 having each notches 33, a fork shaped part 34, and an extension 35, the corresponding parts 32 and 35 being connected to each other by rods 36 and 37. The angle of the elbow is preferably 90° and is bi-sected by the extension arm 35.

To this suspension device are secured the cutting and stirring devices in the same manner as described above with reference to Figs. 3 and 4 and the whole suspension device is suspended by means of the forks 34 from the shaft 12. If now the whole suspension device turns about the shaft 12, the ends of the rod 37 move along the quadrants 9 of the carriages between the stops 38 which are arranged at a distance corresponding to an angle of 90°.

With this suspension device, two cutting and two stirring devices are required; on the other hand, the rollers 15 may be omitted as the pressure of the material upon the cutting and stirring devices may be balanced by suitably choosing the weights of the suspension, cutting and stirring devices.

It is preferred to arrange the chains 5 below the shaft 12, but if required they may be placed above the shaft. In the latter case, supports 39 are fixed to the trough, and the driving gear is suspended as shown by dotted lines in Fig. 1.

The supports 39 might also be mounted upon the floor and the chains 5 might be arranged either below or above the shaft 12. Instead of chains 31 rubber or flexible drag plates might be used.

Claims:

1. A cheese-making machine, comprising a receptacle to contain the material; a pair of carriages adapted to travel along the opposite sides of the receptacle; a shaft disposed transversely of the receptacle and supported at opposite ends in said carriages; a device suspended from said shaft for acting on the material; endless flexible driving elements disposed along opposite sides of the receptacle; means for operating said driving elements in unison; and coupling devices between said driving elements and the ends of said shaft for moving the latter and its suspended device and the carriages as a unit forwardly and backwardly of the receptacle.

2. A cheese-making machine, comprising a receptacle to contain the material; a pair of carriages adapted to travel along the opposite sides of the receptacle; a shaft disposed transversely of the receptacle and supported at opposite ends in said carriages; a device suspended from said shaft for acting on the material; endless flexible driving elements disposed along opposite sides of the receptacle; means for operating said driving elements in unison; and a coupling device between each driving element and the adjacent end of the shaft to transmit the traveling movement of the former to the latter, such device embodying a member pivoted at one end to the driving element and having its other end slotted longitudinally to receive the shaft end.

3. In a cheese-making machine, the combination of a receptacle to contain the material; a reciprocating carrier mounted to travel forwardly and backwardly of the receptacle; driving means for the carrier; a suspension frame attached to the carrier and having an angular movement bodily relative to the same; and a device mounted in said frame for action on the material.

4. In a cheese-making machine, the combination of a receptacle to contain the material; a reciprocating carrier mounted to travel forwardly and backwardly of the receptacle; driving means for the carrier; a suspension frame attached to the carrier; and a device mounted in said frame for action on the material.

5. A cheese-making machine, comprising a receptacle to contain the material; a pair of carriages mounted to travel along the opposite sides of the receptacle; a shaft disposed transversely of the receptacle and supported at opposite ends in said carriages; a device suspended from said shaft for acting on the material; endless flexible driving elements disposed along opposite sides of the receptacle; means for operating said driving elements in unison; and a coupling device between each driving element and the adjacent end of the shaft, to move the latter and its suspended device and the carriages as a unit forwardly and backwardly of the receptacle, said coupling devices being constructed to enable said shaft to momentarily remain at rest on reaching either end of the receptacle.

6. A cheese-making machine, comprising a receptacle to contain the material; a reciprocating carrier mounted to travel forwardly and backwardly on the receptacle and including a transversely-disposed shaft; operating mechanism for the carrier; a suspension frame hooked over said shaft to travel bodily with the same; and a device mounted in said frame for acting on the material.

7. A cheese-making machine, comprising a receptacle to contain the material; a reciprocating carrier mounted to travel forwardly and backwardly on the receptacle and including a transversely-disposed shaft, the end members of the carrier being formed with notches; operating mechanism for the carrier; a suspension frame hooked over said shaft and having extensions engaged in said notches, whereby said frame will be caused to travel bodily with the carrier; and a device mounted in said frame for acting on the material.

8. A cheese-making machine, comprising a receptacle to contain the material; a reciprocating carrier mounted to travel forwardly and backwardly on the receptacle; operating mechanism for the carrier; a suspension frame attached to the carrier to travel therewith and having notches in its side arms; and a device mounted in said frame for acting on the material and having pivot pins at its opposite sides removably engaged in said notches.

9. A cheese-making machine, comprising a receptacle to contain the material; a reciprocating carrier mounted to travel forwardly and backwardly on the receptacle; operating mechanism for the carrier; a suspension frame attached to the carrier; a stirring device rotatably mounted in said frame to act on the material; and a stop bar carried by the suspension frame to limit the rotary movement of the stirring device.

10. A cheese-making machine, comprising a receptacle to contain the material; a reciprocating carrier mounted to travel forwardly and backwardly on the receptacle; operating mechanism for the carrier; a suspension frame attached to the carrier; and a stirring device mounted in said frame to act on the material and provided with a central pressure plate.

11. A cheese-making machine, comprising a receptacle to contain the material; a reciprocating carrier mounted to travel forwardly and backwardly on the receptacle; operating mechanism for the carrier, a suspension frame attached to the carrier; and a stirring device mounted in said frame to act on the material and provided at each end with a scraper.

In testimony whereof I affix my signature.

CORNELIS PIETER DROS.